(12) United States Patent
Minami et al.

(10) Patent No.: US 11,646,466 B2
(45) Date of Patent: May 9, 2023

(54) NON-AQUEOUS ELECTROLYTIC LIQUID SECONDARY BATTERY

(71) Applicant: TDK CORPORATION, Tokyo (JP)

(72) Inventors: Takamasa Minami, Tokyo (JP); Kazuma Akimoto, Tokyo (JP); Hideaki Seki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 164 days.

(21) Appl. No.: 16/635,496

(22) PCT Filed: Mar. 22, 2019

(86) PCT No.: PCT/JP2019/012262
§ 371 (c)(1),
(2) Date: Jan. 30, 2020

(87) PCT Pub. No.: WO2019/182151
PCT Pub. Date: Sep. 26, 2019

(65) Prior Publication Data
US 2020/0235350 A1 Jul. 23, 2020

(30) Foreign Application Priority Data
Mar. 23, 2018 (JP) .............................. JP2018-056886

(51) Int. Cl.
*H01M 50/124* (2021.01)
*H01M 10/0587* (2010.01)
(Continued)

(52) U.S. Cl.
CPC ........... *H01M 50/124* (2021.01); *H01M 4/13* (2013.01); *H01M 10/0525* (2013.01);
(Continued)

(58) Field of Classification Search
CPC .... H01M 50/124; H01M 4/13; H01M 50/103; H01M 50/543; H01M 2004/021;
(Continued)

(56) References Cited

U.S. PATENT DOCUMENTS 7,803,483 B2* 9/2010 Takami ................. H01M 4/661
429/181
9,741,974 B2* 8/2017 Kwon .................. H01M 50/557
(Continued)

FOREIGN PATENT DOCUMENTS

JP 2000-353502 A 12/2000
JP 2002-260603 A 9/2002
(Continued)

OTHER PUBLICATIONS

Jun. 18, 2019 International Search Report issued in International Patent Application No. PCT/JP2019/012262.

*Primary Examiner* — William E McClain
*Assistant Examiner* — Jason Barton
(74) *Attorney, Agent, or Firm* — Oliff PLC

(57) ABSTRACT

A non-aqueous electrolytic liquid secondary battery wherein a potential of a metal layer in an exterior body is kept high, and corrosion can be suppressed, wherein an average thickness t1 of a first part of an exterior body covering a first side surface where a negative and a positive electrode terminal of a power generation element exist is different from an average thickness t2 of a second part of the exterior body covering a second side surface that intersects the first. In plan view of the power generation element from a lamination direction, in a second direction orthogonal to a first direction in which the electrode terminals extend, the relationship of t1<t2 is satisfied when a width of the negative electrode is larger than the positive, and in the second (Continued)

direction, the relationship of t1>t2 is satisfied when the width of the negative electrode is smaller than the positive.

12 Claims, 5 Drawing Sheets

(51) Int. Cl.
| | | |
|---|---|---|
| *H01M 50/133* | (2021.01) | |
| *H01M 50/129* | (2021.01) | |
| *H01M 50/121* | (2021.01) | |
| *H01M 50/119* | (2021.01) | |
| *H01M 4/13* | (2010.01) | |
| *H01M 10/0525* | (2010.01) | |
| *H01M 10/0563* | (2010.01) | |
| *H01M 50/46* | (2021.01) | |
| *H01M 50/557* | (2021.01) | |
| *H01M 50/55* | (2021.01) | |
| *H01M 4/02* | (2006.01) | |

(52) U.S. Cl.
CPC ... *H01M 10/0563* (2013.01); *H01M 10/0587* (2013.01); *H01M 50/119* (2021.01); *H01M 50/121* (2021.01); *H01M 50/129* (2021.01); *H01M 50/1245* (2021.01); *H01M 50/133* (2021.01); *H01M 50/46* (2021.01); *H01M 50/55* (2021.01); *H01M 50/557* (2021.01); *H01M 2004/021* (2013.01); *H01M 2004/027* (2013.01); *H01M 2004/028* (2013.01)

(58) Field of Classification Search
CPC ..... H01M 2004/027; H01M 2004/028; H01M 50/133; H01M 50/145; H01M 50/129; H01M 50/122; H01M 50/126; H01M 50/55; H01M 50/57; H01M 50/105
See application file for complete search history.

(56) References Cited

U.S. PATENT DOCUMENTS

| | | | |
|---|---|---|---|
| 2007/0099076 A1 | 5/2007 | Okuda | |
| 2009/0246607 A1* | 10/2009 | Shinyashiki | B32B 15/043 429/90 |
| 2012/0156551 A1* | 6/2012 | Cho | H01M 10/0431 429/163 |
| 2014/0079983 A1* | 3/2014 | Murata | H01M 50/531 429/161 |
| 2015/0064548 A1* | 3/2015 | Hong | H01M 50/116 429/163 |
| 2017/0025647 A1* | 1/2017 | Taniguchi | H01M 50/119 |
| 2017/0274622 A1 | 9/2017 | Amano et al. | |

FOREIGN PATENT DOCUMENTS

| | | |
|---|---|---|
| JP | 2006-049219 A | 2/2006 |
| JP | 2007-234545 A | 9/2007 |
| JP | 2018-170161 A | 11/2018 |
| WO | 2016/047389 A1 | 3/2016 |

\* cited by examiner

NON-AQUEOUS ELECTROLYTIC LIQUID SECONDARY BATTERY

TECHNICAL FIELD

The present invention relates to a non-aqueous electrolytic liquid secondary battery.

Priority is claimed on Japanese Patent Application No. 2018-056886, filed on Mar. 23, 2018, the content of which is incorporated herein by reference.

BACKGROUND ART

In order to reduce the weight of a battery and to increase the degree of freedom in battery design, a laminated cell in which using a laminated film obtained by laminating a metal layer and a resin layer as an exterior body, a battery element in which an electrode is laminated or wound is hermetically sealed has been put into practical use.

The laminated film has a metal layer and a resin layer covering both surfaces of the metal layer. In a case where a crack or the like occurs in a part of the resin layer of the laminated film, the metal layer of the laminated film may react with the electrolyte. For example, a precipitation reaction in which conductive ions are precipitated as a metal, an alloying reaction in which conductive ions and a constituent metal of the metal layer are alloyed, or the like occur. In a case where these reactions occur, the metal layer of the exterior body corrodes, and the gas barrier property of the laminated film is reduced. The reduction in the gas barrier property of the laminated film reduces the long-term reliability of a non-aqueous electrolytic liquid secondary battery. Therefore, a method capable of suppressing corrosion of the metal layer of the exterior body is required.

Patent Document 1 describes an exterior body for an electrochemical device in which a sheet-like laminate in which at least a base layer, a metal layer, and a sealant layer are laminated in order is formed, and thicknesses of curved portions a and c forming corner portions of the formed metal layer and a thickness of a portion b located between the curved portions satisfy a specific relationship (a≥b>c or a≥c>b).

Patent Document 2 describes a non-aqueous electrolytic liquid secondary battery in which a metal layer of a laminated film is electrically connected to a positive electrode.

CITATION LIST

Patent Literature

[Patent Document 1] PCT International Publication No. WO2016/047389
[Patent Document 2] Japanese Unexamined Patent Application, First Publication No. 2000-353502

DISCLOSURE OF INVENTION

Technical Problem

In the exterior body described in Patent Document 1, the occurrence of a crack is suppressed by controlling the shape of the curved portion. However, the corrosion reaction of the metal cannot be prevented in a case where a crack occurs.

Moreover, in the non-aqueous electrolytic liquid secondary battery described in Patent Document 2, the reduction in the potential of the metal layer is prevented by electrically connecting the metal layer of the laminated film to the positive electrode. However, in a case where the positive electrode is electrically connected to the metal layer, an overvoltage may be applied to the positive electrode due to a short circuit of the metal layer with an external power source or the like.

The present invention has been contrived in view of the above problems, and an object of the present invention is to provide a non-aqueous electrolytic liquid secondary battery in which a potential of a metal layer in an exterior body is kept high, and corrosion can be suppressed.

Solution to Problem

The inventors have conducted intensive studies, and as a result, found that by controlling the thickness of the exterior body, the potential of the metal layer can be kept high without electrical short circuit between the positive electrode and the metal layer of the laminated film.

That is, the present invention provides the following means in order to solve the problem.

(1) A non-aqueous electrolytic liquid secondary battery according to a first aspect including: a power generation element that includes a positive electrode having a positive electrode terminal, a negative electrode having a negative electrode terminal, and a separator positioned between the positive electrode and the negative electrode; and an exterior body that covers the power generating element and has a metal layer and a resin layer covering both surfaces of the metal layer, in which an average thickness $t_1$ of a first part of the exterior body covering a first side surface where the negative electrode terminal and the positive electrode terminal of the power generation element exist is different from an average thickness $t_2$ of a second part of the exterior body covering a second side surface positioned to intersect the first side surface of the power generation element, in plan view of the power generation element from a lamination direction, in a second direction orthogonal to a first direction in which the positive electrode terminal and the negative electrode terminal extend, the average thickness $t_1$ of the first part and the average thickness $t_2$ of the second part satisfy the relationship of $t_1<t_2$ in a case where a width of the negative electrode is larger than a width of the positive electrode, and in plan view of the power generation element from the lamination direction, in the second direction, the average thickness $t_1$ of the first part and the average thickness $t_2$ of the second part satisfy the relationship of $t_1>t_2$ in a case where the width of the negative electrode is smaller than the width of the positive electrode.

(2) In the non-aqueous electrolytic liquid secondary battery according to the above aspect, in a case where the width of the negative electrode is larger than the width of the positive electrode, the average thickness $t_1$ of the first part and the average thickness $t_2$ of the second part may satisfy the relationship of $t_1<t_2$ and the relationship of $0.70 \times t_2 < t_1$.

(3) In the non-aqueous electrolytic liquid secondary battery according to the above aspect, in a case where the width of the negative electrode is smaller than the width of the positive electrode, the average thickness $t_1$ of the first part and the average thickness $t_2$ of the second part may satisfy the relationship of $t_1>t_2$ and the relationship of $t_1<1.43 \times t_2$.

(4) In the non-aqueous electrolytic liquid secondary battery according to the above aspect, at least a part of the negative electrode terminal may be covered with an insulating tape.

Advantageous Effects of Invention

According to the non-aqueous electrolytic liquid secondary battery of the above aspect, the potential of the metal layer in the exterior body is kept high, and corrosion can be suppressed.

DETAILED DESCRIPTION OF INVENTION

Figure 1:
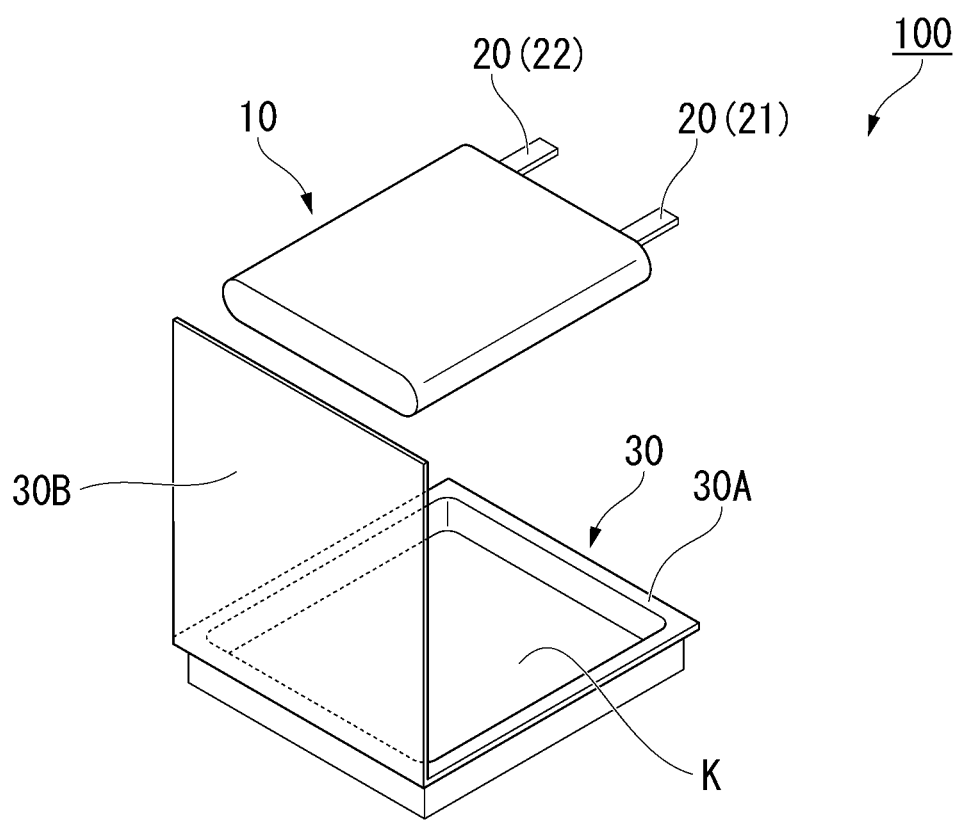
FIG. 1 is a schematic perspective view of a non-aqueous electrolytic liquid secondary battery according to the present embodiment.

Hereinafter, embodiments will be described in detail with appropriate reference to the drawings. In the drawings used in the following description, characteristic parts may be shown in an enlarged manner for the sake of convenience in order to make the characteristics of the present invention easier to understand, and dimensional ratios of the respective constituent elements may be different from actual ratios. The materials, dimensions, and the like exemplified in the following description are merely an example. The present invention is not limited thereto, and can be appropriately modified and implemented within the scope not deviating from the gist of the present invention.

[Non-Aqueous Electrolytic Liquid Secondary Battery]

FIG. 1 is a schematic diagram of a non-aqueous electrolytic liquid secondary battery according to the present embodiment. A non-aqueous electrolytic liquid secondary battery 100 shown in FIG. 1 includes a power generation element 10, two terminals 20 (a negative electrode terminal 21 and a positive electrode terminal 22), and an exterior body 30. The power generation element 10 is accommodated in an accommodation space K provided in the exterior body 30. FIG. 1 shows a state immediately before the power generation element 10 is accommodated in the exterior body 30 for the sake of easy understanding.

[Power Generation Element]

Figure 2:
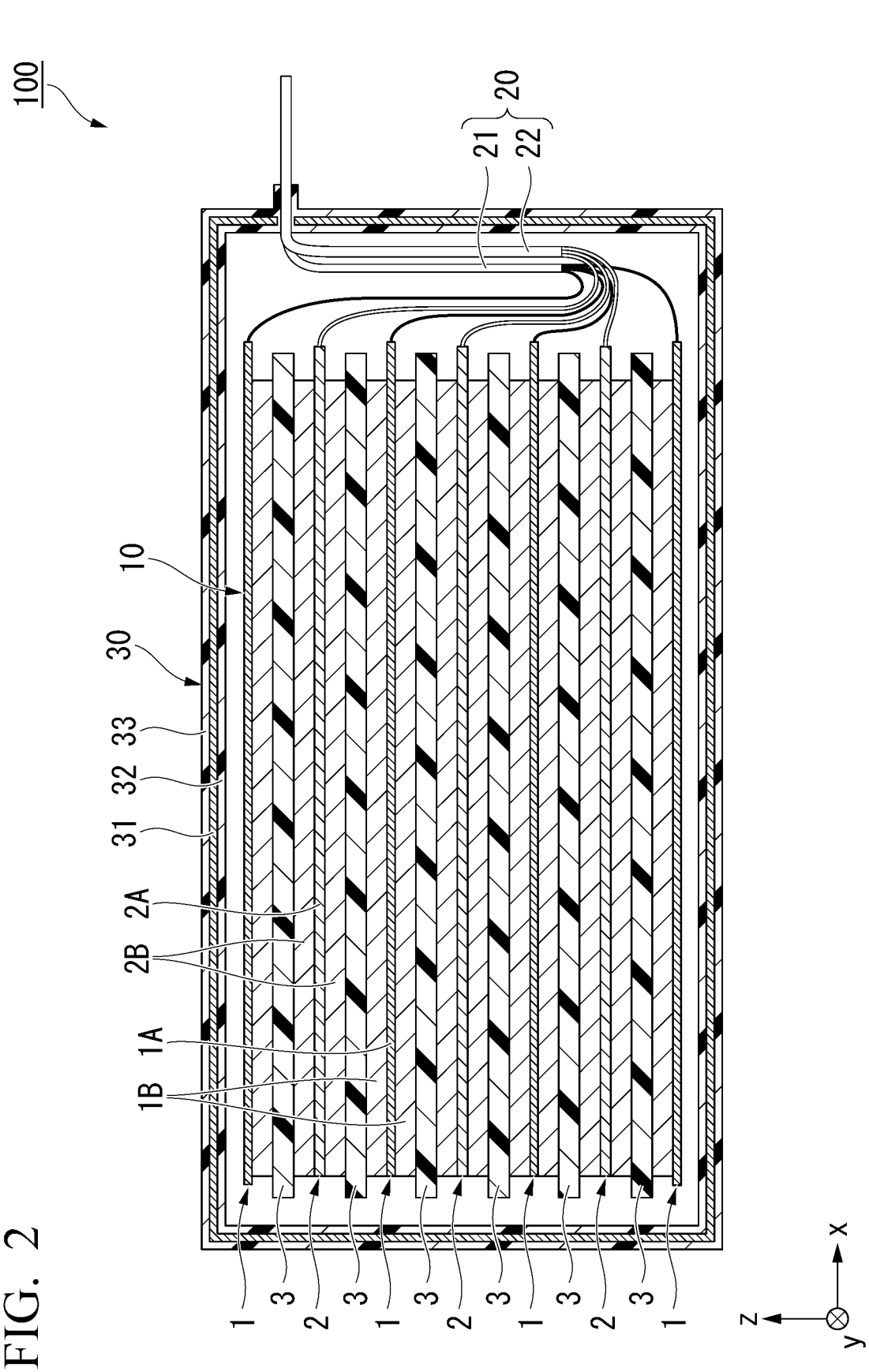
FIG. 2 is a schematic cross-sectional view of the non-aqueous electrolytic liquid secondary battery according to the present embodiment.

FIG. 2 is a schematic cross-sectional view of the non-aqueous electrolytic liquid secondary battery according to the present embodiment. The power generation element 10 shown in FIG. 2 includes a negative electrode 1, a positive electrode 2, and a separator 3. The power generation element 10 shown in FIG. 2 is a laminate in which the negative electrode 1 and the positive electrode 2 are disposed to be opposed to each other with the separator 3 interposed therebetween. The number of negative electrodes 1, positive electrodes 2, and separators 3 in the laminate is not particularly limited. The power generation element 10 may be a wound body obtained by winding a laminate in which the negative electrode 1 and the positive electrode 2 are opposed to each other with the separator 3 interposed therebetween.

Hereinafter, a first direction in which the negative electrode terminal 21 and the positive electrode terminal 22 extend is defined as an x-direction, a lamination direction of the power generation element 10 is defined as a z-direction, and a direction orthogonal to the x-direction and the z-direction is defined as a y-direction. Regarding the "lamination direction of the power generation element 10", in a case where the power generation element 10 is a laminate, the above lamination direction is a lamination direction of the laminate. In a case where the power generation element 10 is a flat wound body, the above lamination direction is a direction in which the distance from the center of winding to the outer surface is the shortest. In a case where the power generation element 10 is a wound body wound concentrically with the center of winding as a reference, the above lamination direction is any direction with the center of winding as a reference. This is because in a case of the wound body, the negative electrode 1, the positive electrode 2, and the separator 3 are laminated with the center of winding as a reference.

The negative electrode 1 has a negative electrode current collector 1A and a negative electrode active material layer 1B having a plate-like (film-like) shape.

The negative electrode active material layer 1B is formed on at least one surface of the negative electrode current collector 1A.

The positive electrode 2 has a positive electrode current collector 2A and a positive electrode active material layer 2B having a plate-like (film-like) shape.

The positive electrode active material layer 2B is formed on at least one surface of the positive electrode current collector 2A.

The negative electrode active material layer 1B and the positive electrode active material layer 2B are impregnated with an electrolytic liquid.

The negative electrode 1 and the positive electrode 2 exchange ions through the electrolytic liquid.

The positive electrode current collector 2A may be a conductive plate material, and for example, a thin metal plate of aluminum, stainless steel, copper, or nickel foil can be used.

As the positive electrode active material used for the positive electrode active material layer 2B, an electrode active material capable of reversibly proceeding ion occlusion and emission, ion desorption and insertion (intercalation), or doping and dedoping of ions and counter anions can be used. As the ions, for example, lithium ions, sodium ions, magnesium ions, and the like can be used, and lithium ions are particularly preferably used.

For example, in a lithium ion secondary battery, a complex metal oxide such as lithium cobaltate ($LiCoO_2$), lithium nickelate ($LiNiO_2$), lithium manganate ($LiMnO_2$), lithium manganese spinel ($LiMn_2O_4$), a complex metal oxide represented by General Formula: $LiNi_xCo_yMn_zM_aO_2$ (x+y+z+a=1, 0≤x<1, 0≤y<1, 0≤z<1, 0≤a<1, and M represents one or more elements selected from Al, Mg, Nb, Ti, Cu, Zn, and Cr), a lithium vanadium compound ($LiV_2O_5$), olivine-type $LiMPO_4$ (where M represents one or more elements selected from Co, Ni, Mn, Fe, Mg, Nb, Ti, Al, and Zr or VO), lithium titanate ($Li_4Ti_5O_{12}$), and $LiNi_xCo_yAl_zO_2$ (0.9<x+y+z<1.1), polyacetylene, polyaniline, polypyrrole, polythiophene, polyacene, and the like can be used as the positive electrode active material.

The positive electrode active material layer 2B may have a conductive material. Examples of the conductive material include carbon powders such as carbon blacks, carbon nanotubes, carbon materials, fine metal powders such as copper, nickel, stainless steel, and iron, mixtures of carbon materials and fine metal powders, and conductive oxides such as ITO. In a case where a sufficient conductive property can be secured only with the positive electrode active material, the positive electrode active material layer 2B may not contain a conductive material.

The positive electrode active material layer 2B contains a binder. A known material can be used as the binder. Examples thereof include fluorine resins such as polyvinylidene fluoride (PVDF), polytetrafluoroethylene (PTFE), tetrafluoroethylene-hexafluoropropylene copolymer (FEP), tetrafluoroethylene-perfluoroalkyl vinyl ether copolymer (PFA), ethylene-tetrafluoro ethylene copolymer (ETFE), polychlorotrifluoroethylene (PCTFE), ethylene-chlorotrifluoroethylene copolymer (ECTFE), and polyvinyl fluoride (PVF).

Other than the above materials, vinylidene fluoride-based fluororubbers such as vinylidene fluoride-hexafluoropropylene-based fluororubbers (VDF-HFP-based fluororubbers), vinylidene fluoride-hexafluoropropylene-tetrafluoroethylene-based fluororubbers (VDF-HFP-TFE-based fluororubbers), vinylidene fluoride-pentafluoropropylene-based fluororubbers (VDF-PFP-based fluororubbers), vinylidene fluoride-pentafluoropropylene-tetrafluoroethylene-based fluororubbers (VDF-PFP-TFE-based fluororubbers), vinylidene fluoride-perfluoromethyl vinyl ether-tetrafluoroethylene-based fluororubbers (VDF-PFMVE-TFE-based fluororubbers), and vinylidene fluoride-chlorotrifluoroethylene-based fluororubbers (VDF-CTFE-based fluororubbers) may be used as the binder.

As the negative electrode active material used for the negative electrode active material layer 1B, a negative electrode active material used for a known non-aqueous electrolytic liquid secondary battery can be used. Examples of the negative electrode active material include particles containing an alkali or alkaline earth metal such as metallic lithium, graphite capable of occluding/emitting ions (natural graphite, artificial graphite), a carbon material such as carbon nanotube, hardly graphitizable carbon, easily graphitizable carbon, or low-temperature baked carbon, a metal such as aluminum, silicon, or tin that can be combined with a metal such as lithium, an amorphous compound mainly composed of an oxide such as $SiO_x$ ($0<x<2$) or tin dioxide, or lithium titanate ($Li_4Ti_5O_{12}$).

The negative electrode current collector 1A, the conductive material, and the binder may be the same as those in the positive electrode 2. For the binder used for the negative electrode, for example, cellulose, a styrene/butadiene rubber, an ethylene/propylene rubber, a polyimide resin, a polyamideimide resin, an acrylic resin, or the like may be used other than those exemplified for the positive electrode.

The separator 3 may be formed of a porous structure having an electrical insulation property, and examples thereof include a single layered body of a film formed of polyolefin such as polyethylene or polypropylene or a laminate thereof, a stretched film of a mixture of the above resins, and a fiber nonwoven fabric formed of at least one constituent material selected from the group consisting of cellulose, polyester, polyacrylonitrile, polyamide, polyethylene, and polypropylene.

In the separator 3, a functional layer such as a heat-resistant layer containing inorganic particles or a heat-resistant resin or an adhesion layer containing an adhesive resin may be laminated on one or both surfaces thereof.

As the electrolytic liquid, an electrolyte solution containing a salt or the like (electrolyte aqueous solution, non-aqueous electrolytic liquid) can be used. The electrolyte aqueous solution has an electrochemically low decomposition voltage, and the withstand voltage during charging is reduced. Accordingly, a non-aqueous electrolytic liquid is preferably used. In the non-aqueous electrolytic liquid, a non-aqueous solvent such as an organic solvent is used as a solvent. A part or all of the non-aqueous solvent may be replaced with an ionic liquid from the viewpoint of safety.

The non-aqueous electrolytic liquid contains a salt (electrolyte) and a non-aqueous solvent. The non-aqueous solvent may contain a cyclic carbonate and a chain carbonate. The ratio between the cyclic carbonate and the chain carbonate in the non-aqueous solvent is preferably 1:9 to 1:1 by volume.

A cyclic carbonate that can solvate the electrolyte is used. For example, ethylene carbonate, propylene carbonate, butylene carbonate, or the like is used as the cyclic carbonate.

The chain carbonate reduces the viscosity of the cyclic carbonate. For example, diethyl carbonate, dimethyl carbonate, ethyl methyl carbonate, or the like is used as the chain carbonate. In addition, chain esters such as methyl acetate, ethyl acetate, methyl propionate, and ethyl propionate, cyclic esters such as γ-butyrolactone, nitriles such as acetonitrile, propionitrile, glutaronitrile, and adiponitrile, 1,2-dimethoxyethane, 1,2-diethoxyethane, and the like may be mixed and used.

An additive may be appropriately added to the electrolytic liquid. As the additive, vinylene carbonate, vinyl ethylene carbonate, fluoroethylene carbonate, propane sultone, butane sultone, adiponitrile, succinonitrile, glutaronitrile, diphenyl carbonate, cyclohexyl benzene, tert-butyl benzene, lithium bisoxalate borate, lithium bis(trifluoromethanesulfonyl)imide, and the like can be used. One additive may be used, or a mixture of two or more additives may be used.

A metal salt can be used as the electrolyte. For example, a lithium salt such as $LiPF_6$, $LiClO_4$, $LiBF_4$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, or LiBOB can be used. These lithium salts may be used alone or in combination of two or more thereof. Particularly, $LiPF_6$ is preferably contained as an electrolyte from the viewpoint of the degree of ionization.

In a case where $LiPF_6$ is dissolved in a non-aqueous solvent, the concentration of the electrolyte in the non-aqueous electrolytic liquid is preferably adjusted to 0.5 to 2.0 mol/L. In a case where the concentration of the electrolyte is 0.5 mol/L or greater, the lithium ion concentration of the non-aqueous electrolytic liquid can be sufficiently secured, and a sufficient capacity is easily obtained during charging and discharging. In addition, in a case where the concentration of the electrolyte is suppressed to 2.0 mol/L or less, an increase in the viscosity of the non-aqueous electrolytic liquid is suppressed, the mobility of lithium ions can be sufficiently secured, and a sufficient capacity is easily obtained during charging and discharging.

In a case where $LiPF_6$ is mixed with other electrolytes, the lithium ion concentration in the non-aqueous electrolytic liquid is also preferably adjusted to 0.5 to 2.0 mol/L, and more preferably, the lithium ion concentration from $LiPF_6$ is 50 mol % or greater.

The non-aqueous electrolytic liquid may be a gel-like electrolyte held in a polymer material. Examples of the polymer material include polyvinylidene fluoride and a copolymer of polyvinylidene fluoride, and examples of the copolymer monomer thereof include hexafluoropropylene and tetrafluoroethylene. The polyvinylidene fluoride and the copolymer thereof are preferable since high battery characteristics can be obtained.

In addition, for example, polyacrylonitrile and a copolymer of polyacrylonitrile can be used as the polymer material, and examples of the copolymer monomer thereof include vinyl-based monomers such as vinyl acetate, methyl methacrylate, butyl methacrylate, methyl acrylate, butyl acrylate, itaconic acid, hydrogenated methyl acrylate, hydrogenated ethyl acrylate, acrylamide, vinyl chloride, vinylidene fluoride, and vinylidene chloride. In addition, an acrylonitrile butadiene rubber, an acrylonitrile butadiene styrene resin, an acrylonitrile polyethylene chloride propylene diene styrene resin, an acrylonitrile vinyl chloride resin, an acrylonitrile methacrylate resin, an acrylonitrile acrylate resin, or the like may be used.

As the polymer material, for example, a polyethylene oxide and a copolymer of polyethylene oxide may be used, and examples of the copolymer monomer thereof include a polypropylene oxide, methyl methacrylate, butyl methacrylate, methyl acrylate, and butyl acrylate. In addition, polyether-modified siloxane and a copolymer thereof may be used.

(Terminal)

Two terminals 20 are provided. One terminal is the negative electrode terminal 21 and the other terminal is the positive electrode terminal 22. One end (first end portion) of the terminal 20 is connected to the power generation element 10, and the other end (second end portion) extends to the outside of the exterior body 30. The two terminals 20 may extend in the same direction or in different directions. The negative electrode terminal 21 is connected to the negative electrode current collector 1A, and the positive electrode terminal 22 is connected to the positive electrode current collector 2A. The connection method is not particularly limited, and welding, screwing, or the like can be used. A conductive material such as aluminum or nickel can be used for the terminal 20.

A sealant formed of a resin may be installed at sealing parts of the negative electrode terminal 21 and the positive electrode terminal 22 with the exterior body 30. The sealant prevents a short circuit between the negative and positive electrode terminals 21 and 22 and a metal layer 31 of the exterior body 30 during heat sealing. The resin preferably contains polyethylene (PE) or polypropylene (PP) in consideration of a sealing property with the exterior body.

(Exterior Body)

The exterior body 30 seals the power generation element 10 and the electrolytic liquid therein. The exterior body 30 has a metal layer 31, an inner surface resin layer 32 that covers an inner surface of the metal layer 31 on the side of the power generation element 10, and an outer surface resin layer 33 that covers an outer surface of the metal layer 31 on the side opposite to the power generation element 10. The exterior body 30 is a so-called metal laminate film.

A polymer film such as polypropylene can be used as the inner surface resin layer 32 and the outer surface resin layer 33. The material of the inner surface resin layer 32 and the material of the outer surface resin layer 33 may be different. For example, a polymer having a high melting point, for example, polyethylene terephthalate (PET), polyamide (PA), or the like is used as the material of the outer surface resin layer 33, and polyethylene (PE), polypropylene (PP), or the like can be used as the material of the polymer film of the inner surface resin layer 32.

In the exterior body 30 shown in FIG. 1, an accommodation space K is formed by folding a first surface 30A having a recessed portion and a second surface 30B. The first surface 30A and the second surface 30B are brought into close contact with each other by sealing the outer peripheries thereof. The exterior body 30 is not limited to the body in which the accommodation space K is formed by folding the first surface 30A and the second surface 30B as shown in FIG. 1, and may be a body in which two films are bonded. The recessed portion may be provided in each of two films, or in only one film.

An average thickness t1 of a first part 301 of the exterior body 30 covering the first side surface 10A where the negative electrode terminal 21 and the positive electrode terminal 22 of the power generation element 10 exist is different from an average thickness t2 of a second part 302 of the exterior body 30 covering the second side surface 10B positioned to intersect the first side surface 10A.

Here, the "first part 301 and second part 302" are parts excluding the sealing sides at their positions, and mean, in the z-direction, a region 0.5 mm or more inside from an end of the projection surface of the power generation element 10 in the x-direction or the y-direction, and in the x- and y-directions, a region 1.5 mm or more inside from an end of the projection surface of the power generation element 10 in the z-direction. That is, a curved portion covering a corner portion of the power generation element 10 in which distances from the top and bottom surfaces and from both the side surfaces are reduced is not included.

The relationship between the average thickness t1 of the first part 301 of the exterior body 30 and the average thickness t2 of the second part 302 of the exterior body 30 varies depending on the configuration of the power generation element 10. In plan view of the power generation element 10 from the z-direction, in the y-direction orthogonal to the x-direction, the relationship of t1<t2 is satisfied in a case where a width W1 of the negative electrode 1 is larger than a width W2 of the positive electrode 2 (W1>W2), and the relationship of t1>t2 is satisfied in a case where the width W1 of the negative electrode 1 is smaller than the width W2 of the positive electrode 2 (W1<W2).

In a case where the average thickness t1 of the first part 301 and the average thickness t2 of the second part 302 of the exterior body 30 satisfy the above relationship in each case, a potential of the metal layer 31 of the exterior body 30 can be kept high.

Figure 3:
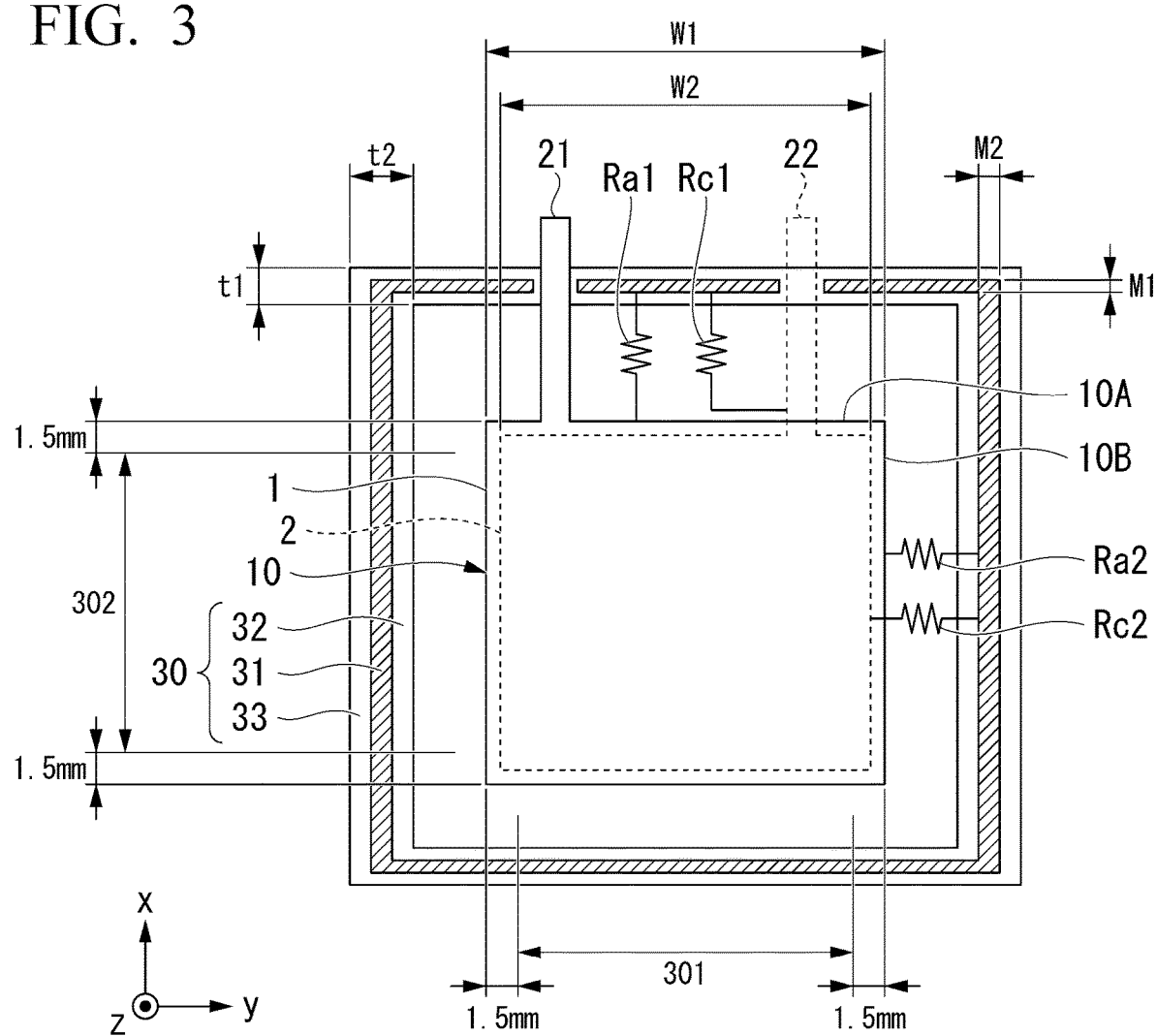
FIG. 3 is a schematic diagram showing a relationship in potential between an exterior body and a power generation element in the non-aqueous electrolytic liquid secondary battery according to the present embodiment.

FIG. 3 is a schematic diagram showing a relationship in potential between the exterior body and the power generation element in the non-aqueous electrolytic liquid secondary battery according to the present embodiment. In FIG. 3, the separator 3 between the negative electrode 1 and the positive electrode 2 is omitted for simplicity. FIG. 3 corresponds to a case where the width W1 of the negative electrode 1 in the y-direction in plan view of the power generation element 10 from the z-direction is larger than the width W2 of the positive electrode 2.

Specific examples of the case where the width W1 of the negative electrode 1 in the y-direction in plan view of the power generation element 10 from the z-direction is larger than the width W2 of the positive electrode 2 include a case where the power generation element 10 is a laminate and a case where the power generation element is a wound body in which the negative electrode is on the outermost peripheral side from the positive electrode. This is because in a case of the laminate, the area of the negative electrode 1 is made larger than the area of the positive electrode 2.

A potential V31 of the metal layer 31 of the exterior body 30 is expressed by the following formula (1).

$$V31 = Va + (Vc - Va) \times 1/(1 + Rc/Ra) \quad (1)$$

Here, in Formula (1), Va represents a potential of the negative electrode 1, Vc represents a potential of the positive electrode 2, Ra represents a resistance between the metal layer 31 of the exterior body 30 and the negative electrode 1, and Rc represents a resistance between the metal layer 31 of the exterior body 30 and the positive electrode 2. Formula (1) is obtained by the product of a cell voltage (Vc−Va) and a ratio of the resistance Rc between the metal layer 31 and the positive electrode 2 to the resistance Ra between the metal layer 31 and the negative electrode 1 on the basis of the potential Va of the negative electrode 1. In Formula (1), the smaller Rc/Ra, the higher the potential V31 of the metal layer 31 of the exterior body 30.

Here, the resistance Ra between the metal layer 31 of the exterior body 30 and the negative electrode 1 is divided into a resistance Ra1 between the metal layer 31 and the negative electrode 1 in the first part 301 and a resistance Ra2 between the metal layer 31 and the negative electrode 1 in the second part 302. In addition, the resistance Rc between the metal layer 31 of the exterior body 30 and the positive electrode 2 is divided into a resistance Rc1 between the metal layer 31 and the positive electrode 2 in the first part 301 and a resistance Rc2 between the metal layer 31 and the positive electrode 2 in the second part 302.

Here, a main resistance element of the metal layer 31 of the exterior body 30 with respect to the power generation element 10 is the inner surface resin layer 32, and the higher the deformation degree of the inner surface resin layer 32, the smaller the resistance of the inner surface resin layer 32. In the formation of the recessed portion where the power generation element 10 is accommodated in the exterior body 30, the resistance is reduced in a side surface portion (a part positioned in a side surface of the power generation element 10) of the exterior body 30 having a high deformation degree. Therefore, it is not necessary to consider the effective contribution to the potential of the metal layer 31 of the exterior body 30 positioned above and below the power generation element 10 having a low deformation degree and a large resistance in the z-direction.

In addition, the deformation degree in each side surface portion has a strong correlation with the amount of change in the thickness in each side surface portion. In the formation of the recessed portion in the exterior body 30, each side surface portion is stretched. Accordingly, the smaller the thickness of the exterior body 30, the smaller the resistance.

In the non-aqueous electrolytic liquid secondary battery shown in FIG. 3, the negative electrode 1 is positioned outside the positive electrode 2 in the second side surface 10B of the power generation element 10 in the y-direction. Accordingly, the resistance Rc2 between the metal layer 31 and the positive electrode 2 in the second part 302 is larger than the resistance Ra2 between the metal layer 31 and the negative electrode 1 in the second part 302. In a case where the power generation element 10 is a wound body in which the negative electrode is positioned on the outermost peripheral side from the positive electrode, the negative electrode 1 exists between the positive electrode 2 and the metal layer 31, and thus the resistance Rc2 between the metal layer 31 and the positive electrode 2 in the second part 302 is particularly larger than the resistance Ra2 between the metal layer 31 and the negative electrode 1 in the second part 302. In other words, it is difficult to reduce Rc/Ra in the second part 302 on the side of the second side surface 10B.

In a case where the resistance between the power generation element 10 and the metal layer 31 in the second part 302 is smaller than the resistance between the power generation element 10 and the metal layer 31 in the first part 301 (in a case where a short circuit is more easily caused between the power generation element 10 and the metal layer 31 in the second part 302 than in the first part 301), the potential V31 of the metal layer 31 is strongly influenced by the resistance between the power generation element 10 and the metal layer 31 in the second part 302. As described above, since it is difficult to reduce Rc/Ra in the second part 302, it is difficult to keep the potential V31 of the metal layer 31 high in this case.

Since the first part 301 includes the negative electrode terminal 21 and the positive electrode terminal 22, the relationship between the negative electrode 1 and the metal layer 31 is equal to the relationship between the positive electrode 2 and the metal layer 31. Accordingly, Rc/Ra is more easily reduced in the first part 301 than in the second part 302. In a case where the resistance between the power generation element 10 and the metal layer 31 in the first part 301 is made smaller than the resistance between the power generation element 10 and the metal layer 31 in the second part 302, the influence of the resistance between the power generation element 10 and the metal layer 31 in the first part 301 on the potential V31 of the metal layer 31 is increased.

In a case where the average thickness t1 of the first part 301 of the exterior body 30 is smaller than the average thickness t2 of the second part 302, the resistance between the power generation element 10 and the metal layer 31 in the first part 301 is smaller than the resistance between the power generation element 10 and the metal layer 31 in the second part 302. In the non-aqueous electrolytic liquid secondary battery shown in FIG. 3, Rc/Ra is more easily reduced in the first part 301 than in the second part 302. That is, in a case where the width W1 of the negative electrode 1 in the y-direction in plan view of the power generation element 10 from the z-direction is larger than the width W2 of the positive electrode 2 (W1>W2, that is, W1/W2>1), Rc/Ra can be made small by making the average thickness t1 of the first part 301 of the exterior body 30 smaller than the average thickness t2 of the second part 302 (t1<t2, that is, t1/t2<1), and the potential of the metal layer 31 of the exterior body 30 can be kept high.

The average thickness t1 of the first part 301 of the exterior body 30 is preferably larger than 0.70×t2 (0.70× t2<t1) from the viewpoint of maintaining the shape of the non-aqueous electrolytic liquid secondary battery. Accordingly, in a case where the width W1 of the negative electrode 1 is larger than the width W2 of the positive electrode 2, the average thickness t1 of the first part 301 and the average thickness t2 of the second part 302 preferably satisfy the relationship of t1<t2 and the relationship of 0.70×t2<t1.

Figure 4:
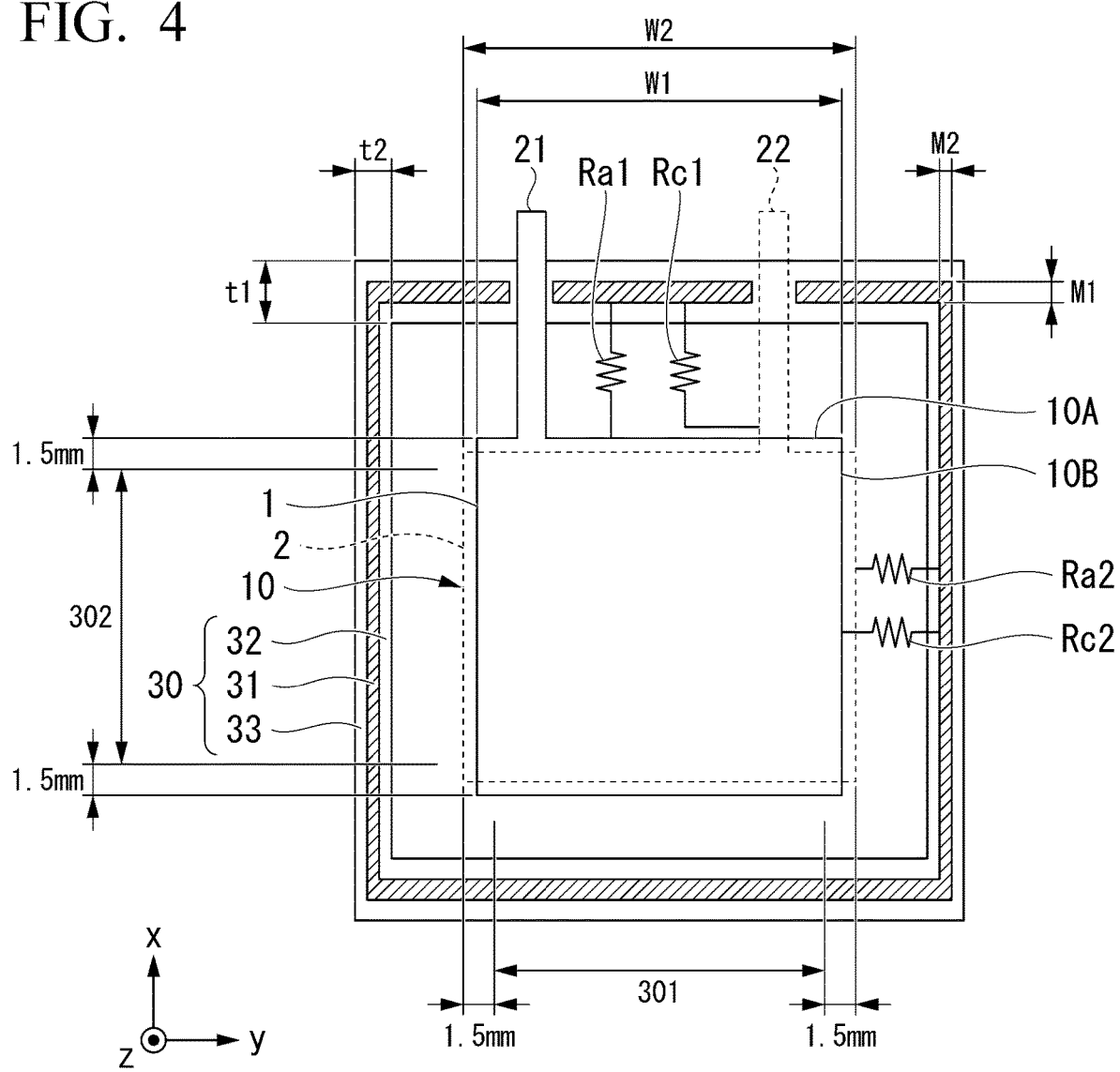
FIG. 4 is a schematic diagram showing a relationship in potential between the exterior body and the power generation element in the non-aqueous electrolytic liquid secondary battery according to the present embodiment.

In a case where the width W1 of the negative electrode 1 in the y-direction in plan view of the power generation element 10 from the z-direction is smaller than the width W2 of the positive electrode 2, the relationship is reversed. FIG. 4 is a schematic diagram showing a relationship in potential between the exterior body and the power generation element in the non-aqueous electrolytic liquid secondary battery according to the present embodiment. In FIG. 4, the separator 3 between the negative electrode 1 and the positive electrode 2 is omitted for simplicity. FIG. 4 corresponds to a case where the width W1 of the negative electrode 1 in the y-direction in plan view of the power generation element 10 from the z-direction is smaller than the width W2 of the positive electrode 2.

Specific examples of the case where the width W1 of the negative electrode 1 in the y-direction in plan view of the power generation element 10 from the z-direction is smaller than the width W2 of the positive electrode 2 include a wound body in which the positive electrode is positioned on the outermost peripheral side from the negative electrode.

In the non-aqueous electrolytic liquid secondary battery shown in FIG. 4, the positive electrode 2 is positioned outside the negative electrode 1 in the second side surface 10B of the power generation element 10 in the y-direction. Accordingly, the resistance Rc2 between the metal layer 31 and the positive electrode 2 in the second part 302 is smaller than the resistance Ra2 between the metal layer 31 and the negative electrode 1 in the second part 302. In other words, Rc/Ra is reduced in the second part 302 on the side of the second side surface 10B.

Since the first part 301 includes the negative electrode terminal 21 and the positive electrode terminal 22, the relationship between the negative electrode 1 and the metal layer 31 is equal to the relationship between the positive electrode 2 and the metal layer 31. Accordingly, Rc/Ra is more easily reduced in the second part 302 than in the first part 301. In a case where the resistance between the power generation element 10 and the metal layer 31 in the second part 302 is made smaller than the resistance between the power generation element 10 and the metal layer 31 in the first part 301, the influence of the resistance between the power generation element 10 and the metal layer 31 in the second part 302 on the potential V31 of the metal layer 31 is increased.

In a case where the average thickness t1 of the first part 301 of the exterior body 30 is larger than the average thickness t2 of the second part 302, the resistance between the power generation element 10 and the metal layer 31 in the first part 301 is larger than the resistance between the power generation element 10 and the metal layer 31 in the second part 302. In the non-aqueous electrolytic liquid secondary battery shown in FIG. 4, Rc/Ra is more easily reduced in the second part 302 than in the first part 301. That is, in a case where the width W1 of the negative electrode 1 in the y-direction in plan view of the power generation element 10 from the z-direction is smaller than the width W2 of the positive electrode 2 (W1<W2, that is, W1/W2<1), Rc/Ra can be made small by making the average thickness t1 of the first part 301 of the exterior body 30 larger than the average thickness t2 of the second part 302 (t2<t1, that is, t1/t2>1), and the potential of the metal layer 31 of the exterior body 30 can be kept high.

The average thickness t1 of the first part 301 of the exterior body 30 is preferably smaller than 1.43×t2 (t1<1.43×t2) from the viewpoint of maintaining the shape of the non-aqueous electrolytic liquid secondary battery. Accordingly, in a case where the width W1 of the negative electrode 1 is smaller than the width W2 of the positive electrode 2, the average thickness t1 of the first part 301 and the average thickness t2 of the second part 302 preferably satisfy the relationship of t1>t2 and the relationship of t1<1.43×t2.

Each of the average thickness t1 of the first part 301 and the average thickness t2 of the second part 302 is obtained as an average value of thicknesses at arbitrary five points in each region.

In a case where a ratio of the thickness of the metal layer 31 to the thickness of the exterior body 30 in the first part 301 is equal to a ratio of the thickness of the metal layer 31 to the thickness of the exterior body 30 to in the second part 302, substitution with a thickness M1 of the metal layer 31 in the first part 301 and a thickness M2 of the metal layer 31 in the second part 302 is possible. That is, it can be said that a ratio t1/t2 of the average thickness t1 of the first part 301 to the average thickness t2 of the second part 302 satisfies a predetermined relationship in a case where a ratio M2/M1 of the thickness M2 of the metal layer 31 in the second part 302 to the thickness M1 of the metal layer 31 in the first part 301 satisfies a predetermined relationship. The case where the ratio of the thickness of the metal layer 31 to the thickness of the exterior body 30 in the first part 301 is equal to the ratio of the thickness of the metal layer 31 to the thickness of the exterior body 30 to in the second part 302 corresponds to a case where a recessed portion is formed in one film and the exterior body 30 is produced.

At least a part of the negative electrode terminal 21 is preferably covered with an insulating tape. In a case where a part of the negative electrode terminal 21 is covered with an insulating tape, the resistance Ra between the metal layer 31 of the exterior body 30 and the negative electrode 1 is increased. That is, Rc/Ra in Formula (1) is reduced, and the potential V31 of the metal layer 31 of the exterior body 30 is increased.

As described above, according to the non-aqueous electrolytic liquid secondary battery of the present embodiment, the potential V31 of the metal layer 31 of the exterior body 30 can be increased. Accordingly, the corrosion reaction of the metal layer 31 can be suppressed.

[Method of Manufacturing Non-Aqueous Electrolytic Liquid Secondary Battery]

The non-aqueous electrolytic liquid secondary battery 100 can be produced by a known method, except that the thickness of the exterior body 30 is controlled. Hereinafter, an example of the method of manufacturing the non-aqueous electrolytic liquid secondary battery 100 will be described in detail.

First, the negative electrode 1 and the positive electrode 2 are produced. The negative electrode 1 and the positive electrode 2 are different from each other only in a substance to be an active material, and can be produced by the same manufacturing method.

A positive electrode active material, a binder, and a solvent are mixed to prepare a coating material. A conductive material may be further added as necessary. For example, water, N-methyl-2-pyrrolidone, N,N-dimethylformamide, or the like can be used as the solvent. The constituent ratio of the positive electrode active material, the conductive material, and the binder is preferably 80 wt % to 90 wt %:0.1 wt % to 10 wt %:0.1 wt % to 10 wt % by mass ratio. These mass ratios are adjusted such that the sum is 100 wt %.

The mixing method of these components of the coating material is not particularly limited, and the mixing order is also not particularly limited. The coating material is applied to the positive electrode current collector 2A. The coating method is not particularly limited, and a method that is normally employed to produce an electrode can be used. Examples thereof include a slit die coating method and a doctor blade method. Similarly, for the negative electrode, a coating material is applied to the negative electrode current collector 1A.

Next, the solvent in the coating material applied to the negative electrode current collector 1A and the positive electrode current collector 2A is removed. The removing method is not particularly limited. For example, the negative electrode current collector 1A and the positive electrode current collector 2A to which the coating material is applied are dried in an atmosphere of 80° C. to 150° C. Then, the negative electrode 1 and the positive electrode 2 are completed.

In a case where the power generation element 10 is a laminate, the negative electrode 1, the positive electrode 2, and the separator 3 are laminated. In a case where the power generation element 10 is a wound body, the negative electrode 1, the positive electrode 2, and the separator 3 are wound with one end side thereof as an axis. In any case, the separator 3 is disposed between the negative electrode 1 and the positive electrode 2.

Figure 5:
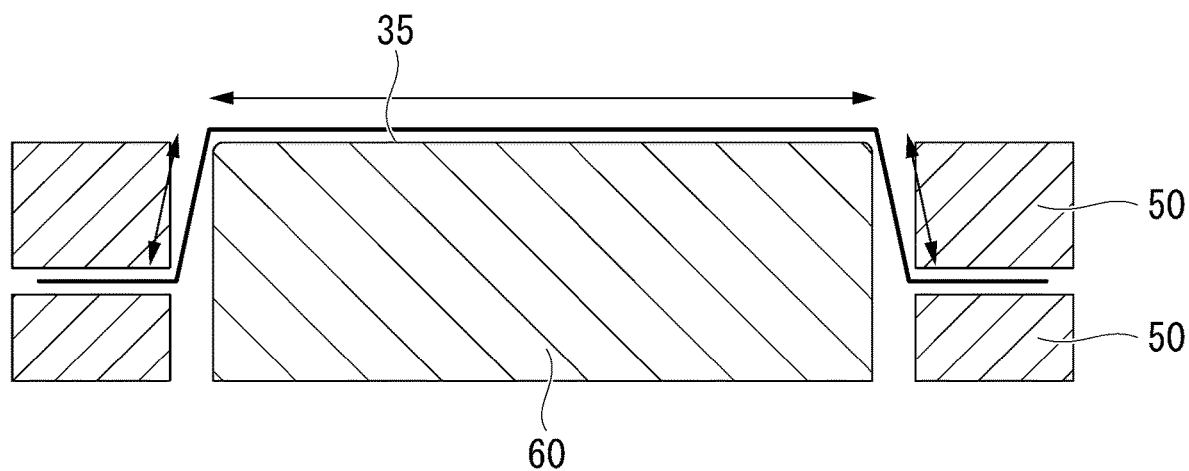
FIG. 5 is a diagram schematically showing an example of a method of manufacturing the exterior body of the non-aqueous electrolytic liquid secondary battery according to the present embodiment.

Next, the exterior body 30 is prepared. FIG. 5 is a diagram schematically showing an example of a method of manufacturing the exterior body of the non-aqueous electrolytic liquid secondary battery according to the present embodiment. First, a uniform exterior film 35 in which a metal layer is interposed between resin layers is prepared. A commercially available product can be used as the exterior film 35.

Next, a predetermined position in the exterior film 35 is pressed by a pressing jig 50. The pressing strength of the exterior film 35 by the pressing jig 50 varies between the x-direction and the y-direction in FIGS. 3 and 4. A die 60 is pressed against the exterior film 35 to form a recessed portion in the exterior film 35. Since the pressing strength of the exterior film 35 varies between the x-direction and the y-direction, the degree of elongation of the exterior film 35 varies between the x-direction and the y-direction. In a direction in which the pressing strength is strong, the exterior film 35 is greatly elongated, and the thickness of the exterior film 35 is likely to be reduced. Accordingly, the average thickness t1 of the first part 301 and the average thickness t2 of the second part 302 of the exterior body 30 can be controlled by adjusting the pressing strength of the exterior film 35 by the pressing jig.

The exterior body 30 in which the thickness in each part is controlled is produced through the above procedures. Then, the power generation element is fitted into the produced recessed portion, and the power generation element 10 is sealed in the exterior body 30.

A non-aqueous electrolytic liquid may be injected into the exterior body 30, or the power generation element 10 may be impregnated with the non-aqueous electrolytic liquid. Then, the exterior body 30 is sealed by applying heat or the like, and a non-aqueous electrolytic liquid secondary battery 100 is produced.

Although the embodiments have been described in detail with reference to the drawings, the configuration in each embodiment and combinations thereof are merely an example, and additions, omissions, substitutions, and other modifications in the configuration can be made without departing from the spirit of the present invention.

EXAMPLES

Example 1

First, a positive electrode active material layer was applied to both surfaces of a positive electrode current collector formed of aluminum foil to produce a positive electrode. The positive electrode active material layer has 94 parts by mass of $LiCoO_2$ (active material), 2 parts by mass of carbon (conductive material), and 4 parts by mass of polyvinylidene fluoride (PVDF, binder).

Similarly, a negative electrode active material layer was applied to both surfaces of a negative electrode current collector formed of copper foil to produce a negative electrode. The negative electrode active material layer has 95 parts by mass of graphite (active material), 1 part by mass of carbon (conductive material), 1.5 parts by mass of styrene butadiene rubber (SBR, binder), and 2.5 parts by mass of carboxymethyl cellulose (CMC, binder).

A separator was produced by applying a heat-resistant layer to one surface of a microporous polyethylene film. The heat-resistant layer has 97 parts by mass of alumina (heat-resistant filler) and 3 parts by mass of polyvinylidene fluoride (PVDF, binder). Then, the positive electrode, the negative electrode, and the separator were laminated to produce a laminate. The number of negative electrodes in the laminate was 14, and the number of positive electrodes was 13. In both surfaces of the laminate in a lamination direction, the negative electrode was positioned outside the positive electrode, and the outermost layer was a negative electrode. A width W1 of the negative electrode in the y-direction in plan view of the laminate was larger than a width W2 of the positive electrode in the y-direction.

Next, an aluminum laminate film was prepared as an exterior body. The aluminum laminate film had a three-layer structure of an inner surface resin layer formed of polypropylene (PP), a metal layer formed of aluminum, and an outer surface resin layer formed of nylon. The total thickness of the aluminum laminate film was 110 μm.

Next, the aluminum laminate film was supported by changing the pressing strength of the aluminum laminate film in the x- and y-directions, and a die was pressed against the aluminum laminate film. A recessed portion was formed in the aluminum laminate film by the die.

The laminate was housed in the exterior body, and a non-aqueous electrolytic liquid was injected to produce a non-aqueous electrolytic liquid secondary battery. As the non-aqueous electrolytic liquid, a material obtained by adding 1.0 M (mol/L) of $LiPF_6$ as a lithium salt to a solvent containing ethylene carbonate (EC), propylene carbonate (PC), and diethyl carbonate (DEC) with a volume ratio of 35:35:30 was used. Two cells were produced under the same conditions. One cell was used for measuring a potential difference (IV) between the positive electrode and the metal layer of the exterior body, and the other cell was used for measuring a ratio t1/t2 of an average thickness t1 of a first part of the exterior body to an average thickness t2 of a second part after taking out the exterior body. t1/t2 was measured, and the relationship of t1/t2=0.98 was satisfied.

The power generation element (laminate) and the metal layer of the exterior body were connected to an oscilloscope having an input resistance of 1 MΩ via a probe with a damping ratio of 10:1, and a potential of the metal layer was measured. The potential of the metal layer reaches a peak immediately after the probe connection, and then exponentially decreases. An initial peak potential IV0 of the metal layer at that time was measured. In addition, measurement of a potential IV1 of the metal layer after 1 second was performed immediately after the production of the cell and after a cycle test including repeating 0.5 CCC charge with an upper limit of 4.2V and 0.5 CCC discharge with a lower limit of 2.8 V was repeated 500 times. Each of IV0 and IV1 was a value obtained by multiplying the measured value by 10 according to the damping ratio of the probe. The cell voltage was adjusted to 3.75V, and the potential of the metal layer was measured as a potential difference (IV) between the positive electrode and the metal layer of the exterior body.

Example 2 and Example 3

Example 2 and Example 3 differ from Example 1 in that the pressing strength of the aluminum laminate film is changed. As a result, in Example 2, the ratio of an average thickness t1 of the first part of the exterior body to an average thickness t2 of the second part is 0.95 (t1/t2=0.95), and in Example 3, the ratio of an average thickness t1 of the first part of the exterior body to an average thickness t2 of the second part is 0.90 (t1/t2=0.90). Other conditions were the same as in Example 1, and an initial potential IV0 and a potential IV1 of the metal layer were measured. That is, a width W1 of the negative electrode in the y-direction in plan view of the power generation element was larger than a width W2 of the positive electrode in the y-direction.

Examples 4 to 6

Examples 4 to 6 differ from Example 1 in that the power generation element is a wound body. The pressing strength of the aluminum laminate film in Example 4 is the same as that in Example 1, the pressing strength of the aluminum laminate film in Example 5 is the same as that in Example 2, and the pressing strength of the aluminum laminate film in Example 6 is the same as that in Example 3. The wound body was produced by winding 7 times a laminate in which a negative electrode, a separator, a positive electrode, and a separator were laminated in this order. The wound body was configured such that the separator constituted the outermost periphery and the negative electrode was positioned outside the positive electrode. A width W1 of the negative electrode in the y-direction in plan view of the power generation element was larger than a width W2 of the positive electrode in the y-direction. Other conditions were the same as in Example 1, and an initial potential IV0 and a potential IV1 of the metal layer were measured.

Example 7

Example 7 differs from Example 4 in that the negative electrode constitutes the outermost periphery. A width W1 of the negative electrode in the y-direction in plan view of the power generation element was larger than a width W2 of the positive electrode in the y-direction. Other conditions were the same as in Example 4, and an initial potential IV0 and a potential IV1 of the metal layer were measured.

Examples 8 to 10

Examples 8 to 10 differ from Examples 4 to 6 in that a wound body having a configuration in which the positive electrode is positioned at the outermost layer is used as the power generation element. A width W1 of the negative electrode in the y-direction in plan view of the power generation element was smaller than a width W2 of the positive electrode in the y-direction. Other conditions were the same as in Examples 4 to 6, and an initial potential IV0 and a potential IV1 of the metal layer were measured.

Example 11

Example 11 differs from Example 10 in that the negative electrode terminal is covered with an insulating protective film (insulating tape). Other conditions were the same as in Example 10, and an initial potential IV0 and a potential IV1 of the metal layer were measured.

Example 12

In Example 12, the production was performed in the same manner as in Example 1, except that for the negative electrode active material layer, 66.5 parts by mass of graphite (active material), 28.5 parts by mass of silicon oxide (active material), 1 part by mass of carbon (conductive material), 1.5 parts by mass of styrene butadiene rubber (SBR, binder), and 2.5 parts by mass of carboxymethyl cellulose (CMC, binder) were used. Other conditions were the same as in Example 1, and an initial potential IV0 and a potential IV1 of the metal layer were measured.

Example 13

In Example 13, the production was performed in the same manner as in Example 1, except that for the negative electrode active material layer, 88 parts by mass of silicon oxide (active material), 2 parts by mass of carbon (conductive material), and 10 parts by mass of polyamideimide (PAI, binder) were used, and the completed negative electrode was heat-treated for 3 hours at 350° C. in a vacuum. Other conditions were the same as in Example 1, and an initial potential IV0 and a potential IV1 of the metal layer were measured.

Example 14

In Example 14, the production was performed in the same manner as in Example 1, except that metallic lithium was used for the negative electrode active material layer. Other conditions were the same as in Example 1, and an initial potential IV0 and a potential IV1 of the metal layer were measured.

Comparative Examples 1 to 3

Comparative Examples 1 to 3 differ from Examples 1, 4, and 8 in that the pressing strength in the x- and y-directions by the pressing jig is made constant such that t1 and t2 are the same. Other conditions were the same as in Examples 1, 4, and 8, and an initial potential IV0 and a potential IV1 of the metal layer were measured.

Comparative Example 4

In Comparative Example 4, the production was performed in the same manner as in Comparative Example 1, except that for the negative electrode active material layer, 66.5 parts by mass of graphite (active material), 28.5 parts by mass of silicon oxide (active material), 1 part by mass of carbon (conductive material), 1.5 parts by mass of styrene butadiene rubber (SBR, binder), and 2.5 parts by mass of carboxymethyl cellulose (CMC, binder) were used. Other conditions were the same as in Comparative Example 1, and an initial potential IV0 and a potential IV1 of the metal layer were measured.

Comparative Example 5

In Comparative Example 5, the production was performed in the same manner as in Comparative Example 1, except that for the negative electrode active material layer, 88 parts by mass of silicon oxide (active material), 2 parts by mass of carbon (conductive material), and 10 parts by mass of polyamideimide (PAI, binder) were used, and the completed negative electrode was heat-treated for 3 hours at 350° C. in a vacuum. Other conditions were the same as in Comparative Example 1, and an initial potential IV0 and a potential IV1 of the metal layer were measured.

Comparative Example 6

In Comparative Example 6, the production was performed in the same manner as in Comparative Example 1, except that metallic lithium was used for the negative electrode active material layer. Other conditions were the same as in Comparative Example 1, and an initial potential IV0 and a potential IV1 of the metal layer were measured.

The results of Examples 1 to 14 and Comparative Examples 1 to 6 are shown in Table 1.

TABLE 1

| | Configuration of Power Generation Element | Outermost Layer | Protective Film | Negative Electrode Active Material | W1/W2 | t1/t2 | Initial Potential IV0 (V) | Immediately After Production of Cell — Potential IV1 After 1 Second (V) | After 500 Cycles — Potential IV1 After 1 Second (V) |
|---|---|---|---|---|---|---|---|---|---|
| Example 1 | Laminate | Negative Electrode | None | Graphite | 1< | 0.980 | 2.4 | 0.01 | 0.01 |
| Example 2 | Laminate | Negative Electrode | None | Graphite | 1< | 0.950 | 2.1 | 0.01 | 0.01 |
| Example 3 | Laminate | Negative Electrode | None | Graphite | 1< | 0.900 | 1.8 | 0.02 | 0.01 |
| Example 4 | Wound Body | Negative Electrode | None | Graphite | 1< | 0.980 | 2.6 | 0.01 | 0.01 |
| Example 5 | Wound Body | Separator (Negative Electrode) | None | Graphite | 1< | 0.950 | 2.3 | 0.01 | 0.01 |
| Example 6 | Wound Body | Separator (Negative Electrode) | None | Graphite | 1< | 0.900 | 2.0 | 0.02 | 0.01 |
| Example 7 | Wound Body | Negative Electrode | None | Graphite | 1< | 0.980 | 2.8 | 0.01 | 0.01 |
| Example 8 | Wound Body | Positive Electrode | None | Graphite | <1 | 1.020 | 1.8 | 0.01 | 0.01 |
| Example 9 | Wound Body | Positive Electrode | None | Graphite | <1 | 1.050 | 1.5 | 0.01 | 0.01 |
| Example 10 | Wound Body | Positive Electrode | None | Graphite | <1 | 1.100 | 1.2 | 0.02 | 0.01 |
| Example 11 | Wound Body | Positive Electrode | Presence | Graphite | <1 | 1.100 | 0.9 | 0.02 | 0.01 |
| Example 12 | Laminate | Negative Electrode | None | Graphite + $SiO_x$ 30 wt % | 1< | 0.980 | 2.4 | 0.01 | 0.09 |
| Example 13 | Laminate | Negative Electrode | None | $SiO_x$ 100 wt % | 1< | 0.980 | 2.4 | 0.01 | 0.14 |
| Example 14 | Laminate | Negative Electrode | None | Metallic Lithium | 1< | 0.980 | 2.4 | 0.01 | 0.16 |
| Comparative Example 1 | Laminate | Negative Electrode | None | Graphite | 1< | 1.000 | 3.15 | 0.01 | 0.72 |
| Comparative Example 2 | Wound Body | Separator (Negative Electrode) | None | Graphite | 1< | 1.000 | 3.3 | 0.01 | 0.78 |
| Comparative Example 3 | Wound Body | Positive Electrode | None | Graphite | <1 | 1.000 | 3.0 | 0.01 | 0.68 |
| Comparative Example 4 | Laminate | Negative Electrode | None | Graphite + $SiO_x$ 30 wt % | 1< | 1.000 | 3.2 | 0.01 | 0.87 |
| Comparative Example 5 | Laminate | Negative Electrode | None | $SiO_x$ 100 wt % | 1< | 1.000 | 3.2 | 0.01 | 1.77 |
| Comparative Example 6 | Laminate | Negative Electrode | None | Metallic Lithium | 1< | 1.000 | 3.2 | 0.01 | 2.23 |

Note)
In the table, the underlined italic numbers indicate that the value is out of the range of the present invention.

From the results in Table 1, the potential difference (IV0) between the positive electrode and the metal layer of the exterior body in an initial state was large in any of Comparative Examples 1 to 6. The fact that the potential difference between the positive electrode and the metal layer of the exterior body in an initial state is large means that the resistance Rc between the positive electrode and the metal layer of the exterior body is large. That is, the potential of the metal layer is lower than that of the positive electrode. In addition, the potential difference (IV1) between the positive electrode and the metal layer of the exterior body after 500 cycles is large. From the above facts, it can be said that due to a low potential of the metal layer, the metal layer reacts with the electrolytic liquid entering from a small crack generated in the inner surface resin layer during repeated charge and discharge, and the metal layer is corroded.

In contrast, in all of Examples 1 to 14, the initial potential IV0 is smaller than the initial potential IV0 of any of Comparative Examples 1 to 6. In addition, in all of Examples 1 to 14, the potential difference (IV1) immediately after the production of the cell is almost the same as the potential difference (IV1) of any of Comparative Examples 1 to 6, and the potential difference (IV1) after 500 cycles is smaller than the potential difference (IV1) of any of Comparative Examples 1 to 6. From the above facts, it can be said that due to a high potential of the metal layer of the exterior body shown in Examples 1 to 14, the metal layer does not react with the electrolytic liquid entering from a small crack generated in the inner surface resin layer during repeated charge and discharge, and the metal layer is not corroded.

REFERENCE SIGNS LIST

1: NEGATIVE ELECTRODE
1A: NEGATIVE ELECTRODE CURRENT COLLECTOR
1B: NEGATIVE ELECTRODE ACTIVE MATERIAL LAYER

2: POSITIVE ELECTRODE
2A: POSITIVE ELECTRODE CURRENT COLLECTOR
2B: POSITIVE ELECTRODE ACTIVE MATERIAL LAYER
3: SEPARATOR
10: POWER GENERATION ELEMENT
10A: FIRST SIDE SURFACE
10B: SECOND SIDE SURFACE
20: TERMINAL
21: NEGATIVE ELECTRODE TERMINAL
22: POSITIVE ELECTRODE TERMINAL
30: EXTERIOR BODY
30A: FIRST SURFACE
30B: SECOND SURFACE
31: METAL LAYER
32: INNER SURFACE RESIN LAYER
33: OUTER SURFACE RESIN LAYER
35: EXTERIOR FILM
50: PRESSING JIG
60: DIE
100: NON-AQUEOUS ELECTROLYTIC LIQUID SECONDARY BATTERY
301: FIRST PART
302: SECOND PART
K: ACCOMMODATION SPACE
t1, t2, M1, M2: AVERAGE THICKNESS
W1, W2: WIDTH

The invention claimed is:

1. A non-aqueous electrolytic liquid secondary battery comprising:
a power generation element that includes a positive electrode having a positive electrode terminal, a negative electrode having a negative electrode terminal, and a separator positioned between the positive electrode and the negative electrode; and
an exterior body that covers the power generating element and includes a metal layer and two resin layers covering opposite surfaces of the metal layer such that the metal layer is sandwiched between the two resin layers,
wherein an average thickness t1 of a first part of the exterior body covering a first side surface where the negative electrode terminal and the positive electrode terminal of the power generation element exist is different from an average thickness t2 of a second part of the exterior body covering a second side surface positioned to intersect the first side surface of the power generation element,
in a plan view of the power generation element from a lamination direction, the average thickness t1 of the first part and the average thickness t2 of the second part satisfy the relationship of t1<t2 in a case where a width of the negative electrode is larger than a width of the positive electrode, the width of the negative electrode and the width of the positive electrode extending in a direction orthogonal to an extending direction of the positive electrode terminal and the negative electrode terminal,
a resistance between the power generation element and the metal layer in the first part is smaller than a resistance between the power generation element and the metal layer in the second part in the case where the average thickness t1 of the first part and the average thickness t2 of the second part satisfy the relationship of t1<t2,
in a plan view of the power generation element from the lamination direction, the average thickness t1 of the first part and the average thickness t2 of the second part satisfy the relationship of t1>t2 in a case where the width of the negative electrode is smaller than the width of the positive electrode,
the average thickness t1 of the first part extends in a first direction, and the average thickness t2 of the second part extends in a second direction,
the first direction is a direction along which the metal layer is sandwiched between the two resin layers in the first part,
the second direction is a direction along which the metal layer is sandwiched between the two resin layers in the second part, and
the first direction and the second direction are transverse to each other and are transverse to a stacking direction of the positive electrode, the negative electrode, and the separator in the power generation element.

2. The non-aqueous electrolytic liquid secondary battery according to claim 1,
wherein in the case where the width of the negative electrode is larger than the width of the positive electrode, the average thickness t1 of the first part and the average thickness t2 of the second part satisfy the relationship of t1<t2 and the relationship of $0.70 \times t2 < t1$.

3. The non-aqueous electrolytic liquid secondary battery according to claim 1,
wherein in the case where the width of the negative electrode is smaller than the width of the positive electrode, the average thickness t1 of the first part and the average thickness t2 of the second part satisfy the relationship of t1>t2 and the relationship of $t1 < 1.43 \times t2$.

4. The non-aqueous electrolytic liquid secondary battery according to claim 2,
wherein in the case where the width of the negative electrode is smaller than the width of the positive electrode, the average thickness t1 of the first part and the average thickness t2 of the second part satisfy the relationship of t1>t2 and the relationship of $t1 < 1.43 \times t2$.

5. The non-aqueous electrolytic liquid secondary battery according to claim 1,
wherein at least a part of the negative electrode terminal is covered with an insulating tape.

6. The non-aqueous electrolytic liquid secondary battery according to claim 2,
wherein at least a part of the negative electrode terminal is covered with an insulating tape.

7. The non-aqueous electrolytic liquid secondary battery according to claim 3,
wherein at least a part of the negative electrode terminal is covered with an insulating tape.

8. The non-aqueous electrolytic liquid secondary battery according to claim 4,
wherein at least a part of the negative electrode terminal is covered with an insulating tape.

9. The non-aqueous electrolytic liquid secondary battery according to claim 1, wherein the resistance between the power generation element and the metal layer in the first part is larger than a resistance between the power generation element and the metal layer in the second part in a case where the average thickness t1 of the first part and the average thickness t2 of the second part satisfy the relationship of t1>t2.

10. A non-aqueous electrolytic liquid secondary battery comprising:
a power generation element that includes a positive electrode having a positive electrode terminal, a negative electrode having a negative electrode terminal, and a separator positioned between the positive electrode and the negative electrode; and an exterior body that covers the power generating element and includes a metal layer and two resin layers covering opposite surfaces of the metal layer such that the metal layer is sandwiched between the two resin layers, wherein an average thickness t1 of a first part of the exterior body covering a first side surface where the negative electrode terminal and the positive electrode terminal of the power generation element exist is different from an average thickness t2 of a second part of the exterior body covering a second side surface positioned to intersect the first side surface of the power generation element, in a plan view of the power generation element from a lamination direction, the average thickness t1 of the first part and the average thickness t2 of the second part satisfy the relationship of t1<t2 in a case where a width of the negative electrode is larger than a width of the positive electrode, the width of the negative electrode and the width of the positive electrode extending in a direction orthogonal to an extending direction of the positive electrode terminal and the negative electrode terminal, a resistance between the power generation element and the metal layer in the first part is smaller than a resistance between the power generation element and the metal layer in the second part, the average thickness t1 of the first part extends in a first direction, and the average thickness t2 of the second part extends in a second direction, the first direction is a direction along which the metal layer is sandwiched between the two resin layers in the first part, the second direction is a direction along which the metal layer is sandwiched between the two resin layers in the second part, and the first direction and the second direction are transverse to each other and are transverse to a stacking direction of the positive electrode, the negative electrode, and the separator in the power generation element.

11. The non-aqueous electrolytic liquid secondary battery according to claim 1, wherein the first part of the exterior body consists of the metal layer and the two resin layers, and the second part of the exterior body consists of the metal layer and the two resin layers.

12. The non-aqueous electrolytic liquid secondary battery according to claim 1, wherein the first direction is parallel to the extending direction of the positive electrode terminal and the negative electrode terminal.

* * * * *